July 1, 1969 A. R. ANDIS 3,452,916
TINNING-OIL LEVEL CONTROL FOR A SOLDERWAVE APPARATUS
Filed July 7, 1967

INVENTOR
ALLEN RICHARD ANDIS
BY

United States Patent Office 3,452,916
Patented July 1, 1969

3,452,916
TINNING-OIL LEVEL CONTROL FOR A SOLDER-WAVE APPARATUS
Allen Richard Andis, 3209 Elwood Drive,
Racine, Wis. 53406
Filed July 7, 1967, Ser. No. 651,801
Int. Cl. B23k 35/36, 1/12
U.S. Cl. 228—36                5 Claims

ABSTRACT OF THE DISCLOSURE

This invention is an adjunct to a soldering apparatus which apparatus is employed to impinge solder in a molten state against a circuit board in the operation of soldering the various components to the board. A "blanket" of liquid, usually a suitable oil, is maintained on the surface of the molten solder in order to prevent oxidization of the latter. In time, the liquid becomes contaminated and must be replaced with fresh liquid. This invention is intended to provide a means of removing the contaminated liquid, to replace it with fresh liquid and to maintain an optimum quantity thereof on the surface of the solder during the soldering process.

Background of the invention

The soldering process embracing this invention includes a tank of molten solder which solder is sprayed in the form of a "fountain" against the under surface of the circuit board as the latter is conveyed over the tank. In order to maintain the solder in an unoxidized condition, it is necessary to provide a layer or blanket of suitable liquid on the surface thereof to seal the solder from contact with the air and other oxidizing elements. During the process of soldering, the liquid becomes contaminated by contact with the air and molten solder, and must be replaced, preferably without interrupting the soldering operation, and while also maintaining a layer of liquid of an optimum depth on the surface of the solder.

An object, therefore, of this invention is to provide a means of replacing contaminated liquid, which covers the surface of the molten solder, with a fresh supply of the liquid.

Another object is to provide a means of maintaining an optimum level of liquid over the solder during the operation of replacing the liquid.

Another object is to provide a means of adjusting the optimum level of the liquid.

Another object is to provide a means of periodically supplying liquid to the solder tank.

Another object is to provide vacuum means that will aid in syphon-priming, and dissipating vapors from the liquid in the syphon conduit.

Further objects and advantages of this invention will become apparent from a consideration of the following detailed description taken in connection with the accompanying drawings wherein an embodiment of the invention is shown. It is, however, to be understood that the invention is not limited to the details disclosed, but includes all such variations as fall within the spirit of the invention.

Referring to the drawings.

Figure 1:
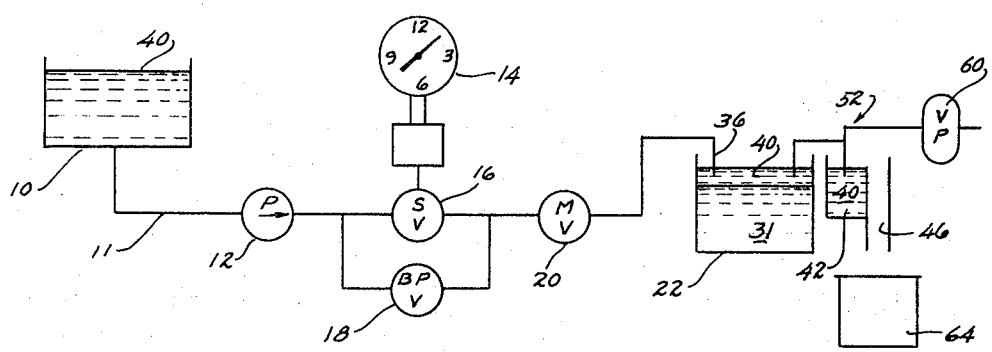
FIG. 1 is a diagrammatic view of the complete apparatus for supplying and replacing the liquid, and to perform such an operation automatically if desired.
Figure 2:
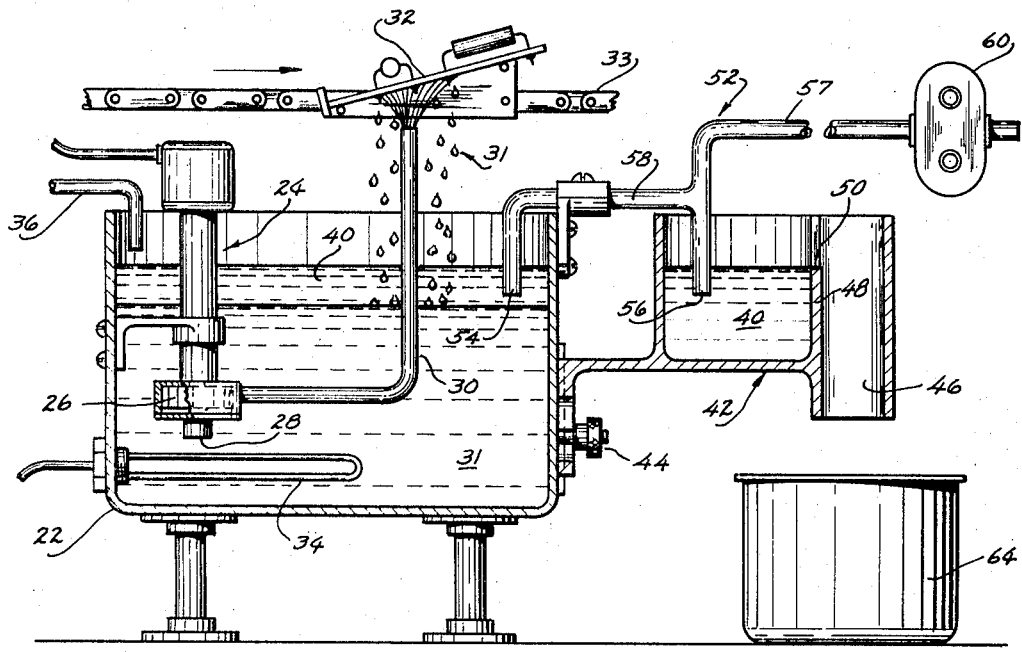
FIG. 2 shows a portion of FIG. 1 in greater detail, embracing the invention and showing the soldering process in operation.
Figure 3:
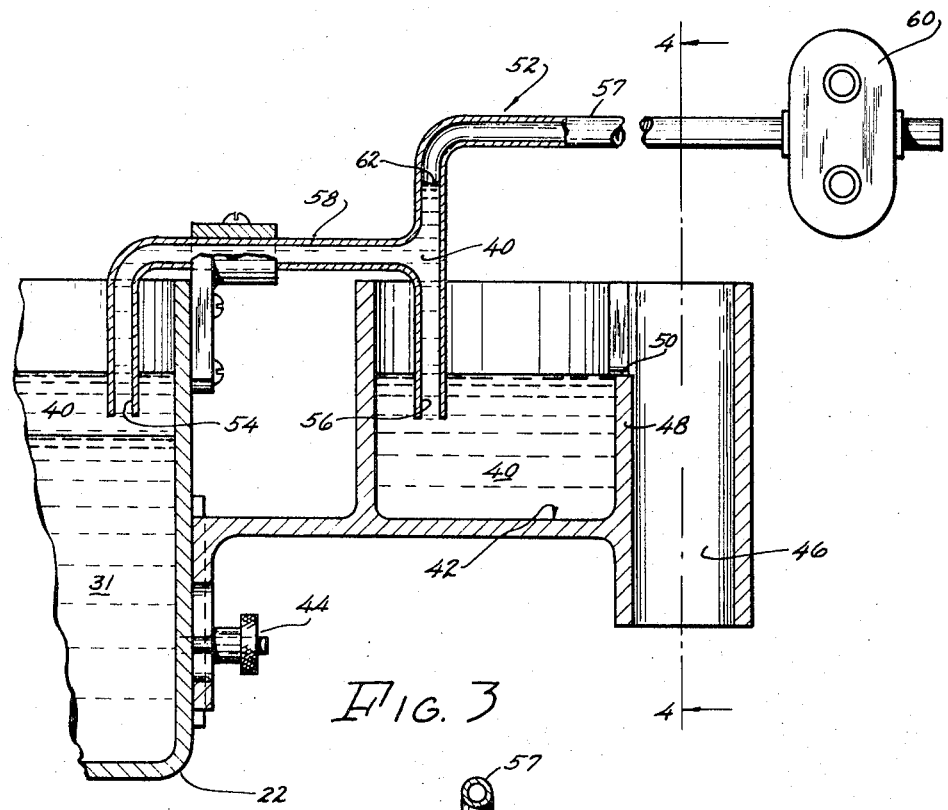
FIG. 3 is an enlarged view of a portion of FIG. 2.
Figure 4:
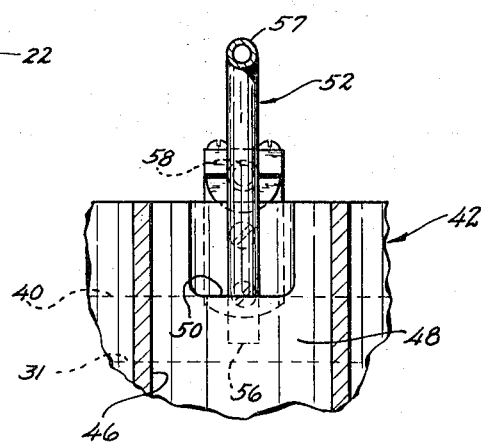
FIG. 4 is a section taken at 4—4 of FIG. 3.

Referring again to the drawings, particularly FIG. 1, the apparatus comprises a liquid-supply reservoir 10 and a conduit 11, the flow of liquid being controlled initially by a pump 12. A clock 14 may be employed to periodically supply liquid through a solenoid valve 16. A by-pass valve 18 may be employed when desired, for manual control. A metering valve 20 serves to adjust the rate of flow of the liquid entering the solder tank 22. Referring also to FIGS. 2, 3 and 4; a pump 24 has an impeller 26 and an inlet orifice 28 for the molten solder. A conduit 30 conveys the solder 31 upwardly to be impinged against the circuit board 32 which traverses the "fountain" of molten solder by means of a conveyor 33.

Tank 22 is provided with an electric heating element 34 to maintain the solder 31 in a molten state. A liquid supply tube 36 conveys the liquid to the tank 22. The solder 31 is normally of a quantity to approximately reach the level shown when in a molten state and with the pump 24 in operation. The liquid or oil 40 blankets the molten solder 31 to an optimum depth considered necessary to prevent oxidation of the solder.

An overflow cup 42 is placed adjacent to tank 22, and is provided with vertical-adjustment means 44 with relation to the tank 22. Cup 42 is provided with an overflow passageway 46. Wall 48 is provided with an overflow dam 50 for a purpose that will appear.

A syphon 52 is positioned as shown, and comprises a first orifice conduit 54 which extends downwardly, terminating above the surface of the molten solder 31, but below the surface of the liquid 40. A second orifice conduit 56 extends into overflow cup 42 to terminate below the dam 50 and is immersed in the fluid or liquid 40. A connecting conduit 58 connects orifice conduits 54 and 56 to provide a continuous passageway for the flow of liquid from tank 22 to cup 42. Orifice conduit 56 extends upwardly to a point above conduit 58 and is then directed laterally in a conduit 57 as shown in FIGS. 2 and 3 in order to avoid interferring with the conveyer 33 which carries the circuit boards 32. A vacuum pump 60 serves to provide a continuous controlled vacuum in syphon 52 in order to maintain the liquid 40 at the height shown by the miniscus 62 in conduit 56, thus initiating a flow of liquid from tank 22 to cup 42 when there is an excess of liquid in the tank 22. The vacuum produced by pump 60, however, should be such as to hold the miniscus 62 at a level below the bore of conduit 57. The optimum liquid level in tank 22 is established when it coincides with the level of liquid in cup 42 and with overflow dam 50.

A necessary prerequisite when replacing contaminated liquid is that orifices 54 and 56 must be immersed in liquid 40 in order to establish a vacuum sufficient to raise the liquid in conduit 56 to the level shown by the miniscus 62, the cycle of operation being as follows: with vacuum pump 60 in operation, fresh liquid is admitted into tank 22 by means of tube 36. When the level of liquid in tank 22 exceeds that at dam 50, the syphon effect generated in orifices 54 and 56 and connecting orifice conduit 58 causes the excess liquid to discharge into cup 42. As the level in cup 42 exceeds the level of dam 50, the excess flows over the dam, and is discharged into a sump container 64. This operation continues until flow of liquid from tube 36 is interrupted, and the levels in tank 22, cup 42 and dam 50 coincide. If it is desired to change the optimum quantity of liquid on the solder in tank 22, overflow cup 42 is raised or lowered to increase or lower the level, by means of adjusting means 44.

If a clock 14 is employed to periodically admit liquid to tank 22, it can be set to actuate solenoid valve 16 so that the process of changing the liquid can be caused to occur when the liquid has lost its effectiveness.

When the soldering process is stopped and the pump 24 no longer pumps solder, the resulting higher level of solder due to the collapse of the solder wave will block the orifice 54. The liquid is thus prevented from entering the syphon and be wasted. During this cycle, the vacuum pump 60 will not produce a vacuum sufficient to raise the molten solder into the syphon 52. When the process is to be resumed, the heating element 34 is caused to melt the solder 31 and pump 24 begins to circulate the solder, thus lowering the level thereof to a point below the orifice 54, permitting the liquid 40 to again flow through syphon 52 when liquid is being replaced.

The above being a complete description of an illustrative embodiment of the invention, what is claimed as new and desired to be secured by Letters Patent of the United States is:

1. In a soldering apparatus comprising a solder tank containing molten solder, means to impinge said solder, and a liquid additive on the surface of said solder having a density less than that of said solder, in combination, means to simultaneously, remove said liquid from said tank when contaminated and supply fresh liquid thereto, and to maintain said liquid at an optimum level, comprising an overflow cup adjacent said tank, containing said liquid additive and having an overflow dam to establish the said optimum level of said liquid in said tank, syphon means to transfer said liquid from said tank to said cup, the excess liquid flowing over said dam to a sump until the said supply is interrupted and the level of the liquid in said tank and said cup coincides with the said dam.

2. A soldering apparatus as set forth in claim 1, in which said cup is adjustable vertically relative to said tank in order to provide a means to adjust the optimum depth of said liquid on said solder.

3. A soldering apparatus as set forth in claim 1, in which said syphon is provided with auxiliary vacuum-producing means.

4. A soldering apparatus as set forth in claim 1, in which said syphon means comprises a member having a first orifice submerged in said liquid in said tank, a second orifice submerged in the liquid in said cup, a transverse conduit connecting said first and second orifices, and means on said member to maintain a controlled vacuum in said syphon means to raise said liquid to a height above said transverse conduit.

5. A soldering apparatus as set forth in claim 1, in which said syphon means comprises a tubular member having a first orifice submerged in said liquid in said tank, a second orifice submerged in the liquid in said cup, a transverse conduit connecting said first and second orifices, and means on said tubular member to maintain a controlled vacuum in said syphon means to raise said liquid in said syphon to a height above said transverse conduit.

References Cited
UNITED STATES PATENTS 3,056,370  10/1962  Barnes _____ 228—36

RICHARD H. EANES, Jr., *Primary Examiner.*